Figure 4:
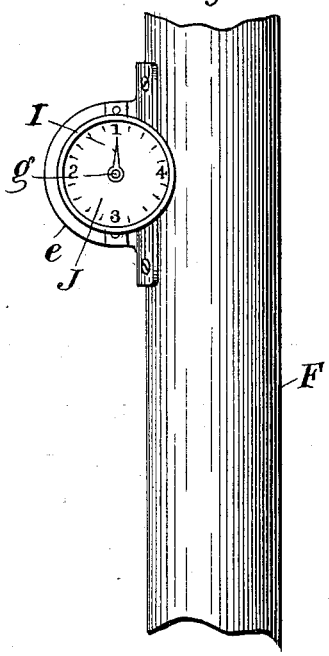
Figure 5:
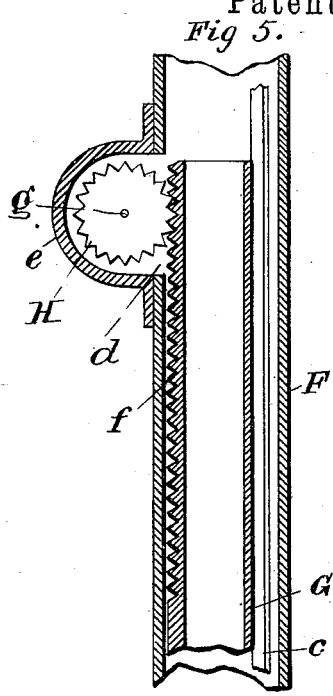
Figure 6:
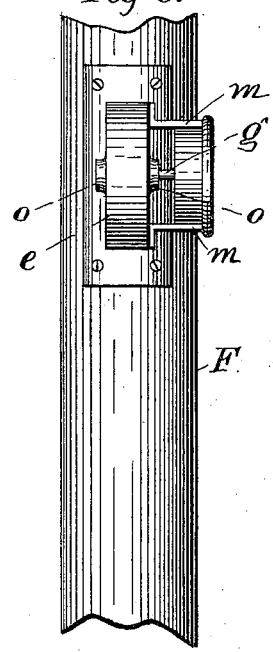
Figure 7:
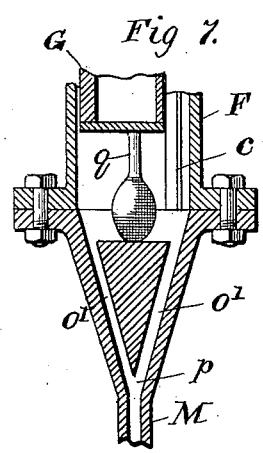
Figure 9:
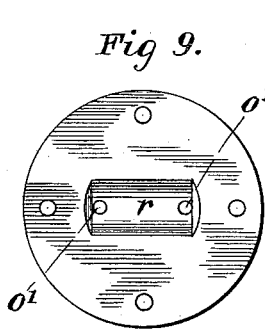

(No Model.) 2 Sheets—Sheet 1.
J. KEMPF.
WATER INDICATOR FOR STEAM BOILERS.
No. 601,617. Patented Mar. 29, 1898.
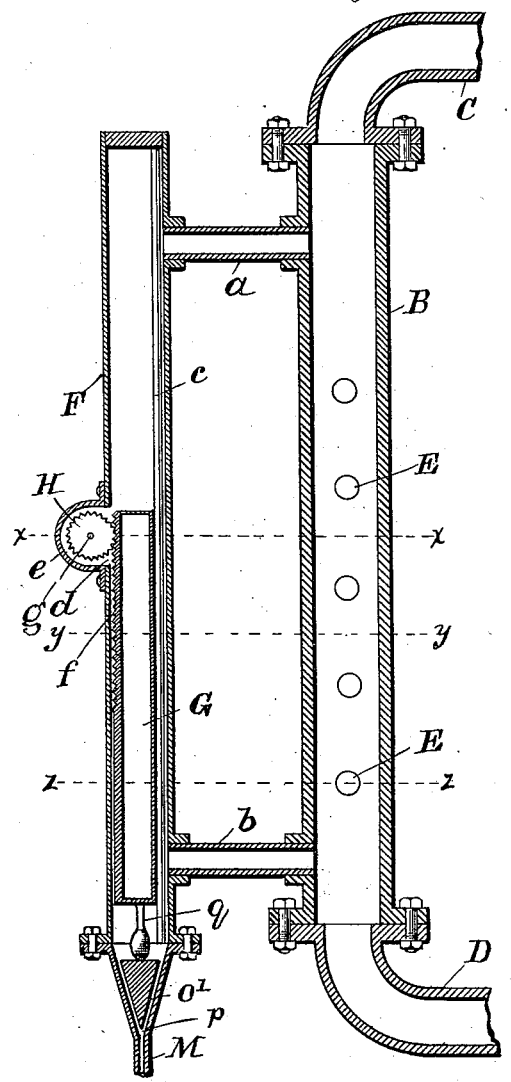
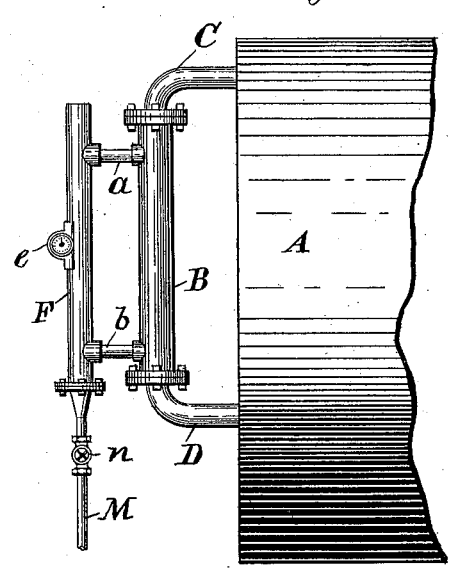
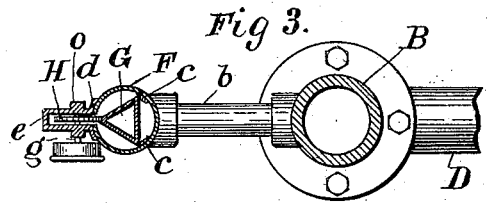
Witnesses.
Dan'l Fisher
H. Constantine
Inventor.
John Kempf
by Geo. W. T. Howard
Atty.

(No Model.) 2 Sheets—Sheet 2.

J. KEMPF.
WATER INDICATOR FOR STEAM BOILERS.

No. 601,617. Patented Mar. 29, 1898.

Witnesses.
Dan'l Fisher
H. Constantine

Inventor.
John Kempf
by G. H. W. T. Howard
atty.

UNITED STATES PATENT OFFICE.

JOHN KEMPF, OF BALTIMORE, MARYLAND, ASSIGNOR OF ONE-HALF TO JOHN M. HOFFMAN, OF SAME PLACE.

WATER-INDICATOR FOR STEAM-BOILERS.

SPECIFICATION forming part of Letters Patent No. 601,617, dated March 29, 1898.

Application filed August 26, 1897. Serial No. 649,584. (No model.)

*To all whom it may concern:*

Be it known that I, JOHN KEMPF, of the city of Baltimore and State of Maryland, have invented certain Improvements in Water-Indicators for Steam-Boilers, of which the following is a specification.

In the description of the said invention which follows reference is made to the accompanying drawings, forming a part thereof, and in which—

Figure 1 is an exterior side view of the front end of a steam-boiler provided with the improved water-indicator. Fig. 2 is an enlarged sectional view of the indicator alone. Fig. 3 is a cross-section of Fig. 2, taken on the dotted line $x\,x$. Figs. 4 to 9, inclusive, are enlarged details of the invention.

Referring now to the drawings, A represents a steam-boiler, and B a chamber connected at its upper end by a pipe C to the steam-space of the boiler and at its lower end by a similar pipe D to the water-space of the same. To the wall of this chamber are applied the ordinary gage-cocks. (Indicated in Fig. 2 by E.)

F is a float-chamber united to the chamber B by the nozzles $a$ and $b$, the former being near the top of the float-chamber and the latter near its bottom. These nozzles are unobstructed or unprovided with stop-cocks, so that the communication between the two chambers cannot at any time be cut off.

Within the float-chamber is a hollow float G of triangular cross-section, so that it can fit the chamber and yet have spaces around it for water, as shown in Fig. 3.

The inner surface of the float-chamber has two ribs $c$, which serve as guides for the float and prevent its turning in the chamber. These guides are shown in cross-section in Fig. 3.

At the front side of the float-chamber is an opening $d$, over which is secured a cap $e$ of semicircular shape, as seen from either side of the chamber. Within this cap is a spur gear-pinion H in mesh with the teeth $f$ of a rack on the front edge of the float G. The pinion is tight on a shaft $g$, which rests and turns in bearings $o$ in the sides of the cap. One end of this shaft passes through its bearing-box and is provided with a hand or pointer I, which, in connection with a dial J, covered by a glass plate and secured firmly to the cap $e$ by brackets $m$, indicates the position of the float, and thereby the height of the water in the two chambers and the boiler.

At the lower end of the float-chamber is a pipe M, with a cock $n$ to clear the float-chamber of any sediment which may collect therein.

Figure 8:
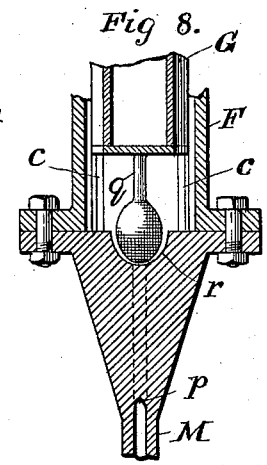

The upper end of the cleaning-pipe is conical and has two branch openings $o'$, which converge at $p$. The metal between the branch openings serves as a stop for the float G, or rather for an extension $q$ of the float, which extension has a hollow ball at its end, and the surface of this metal is provided with a depression $r$ to receive the said ball and hold it in a central position when viewed from the front, as shown in Fig. 8.

The high-water line is denoted by $y\,y$ and the low-water line by $z\,z$.

It is intended that the pointer shall make one revolution in the rise of the water in the boiler from the lowest to the highest point.

I claim as my invention—

1. In a water-indicator for a steam-boiler, a float-chamber having a float which is triangular in cross-section and provided with a toothed rack at one of its edges, combined with a pinion, a hand on the pinion-shaft and a dial, substantially as specified.

2. In a water-indicator for a steam-boiler, the combination of a cylindrical float-chamber having vertical ribs which project from its inner surface, a float which is triangular in cross-section with a toothed rack at one of its edges, adapted to fit between the ribs of the float-chamber, a shaft which extends transversely of the float-chamber having at its outer end an indicating-pointer and at the inner end a pinion in gear with the toothed rack, and a marked dial situated behind the said indicating-pointer, substantially as specified.

JOHN KEMPF.

Witnesses:
WM. T. HOWARD,
DANL. FISHER.